C. C. COOK.
SUCKER ROD.
APPLICATION FILED JULY 19, 1913.
1,101,682.
Patented June 30, 1914.
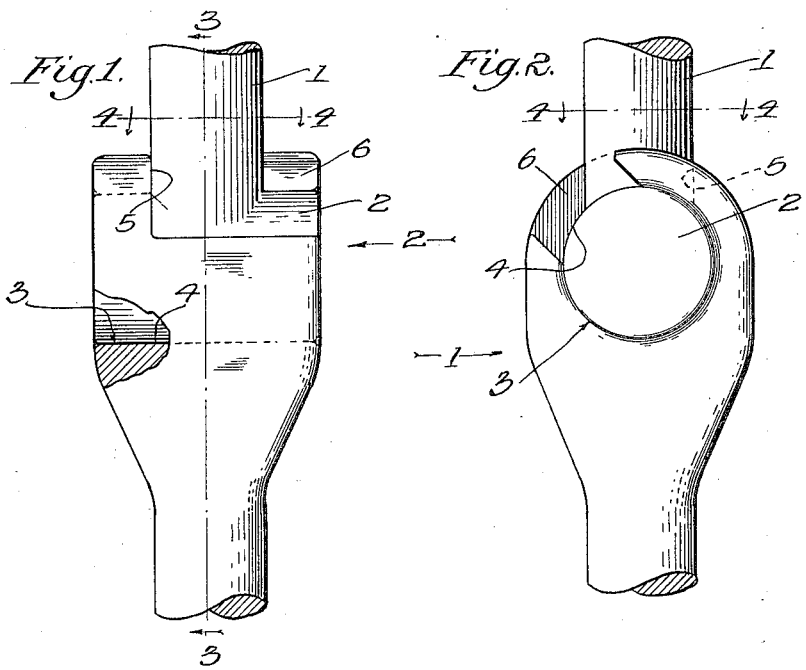
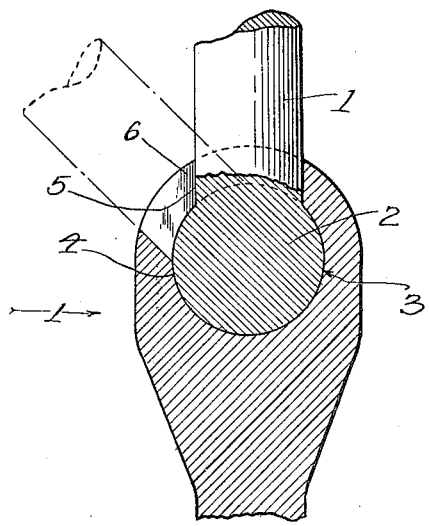
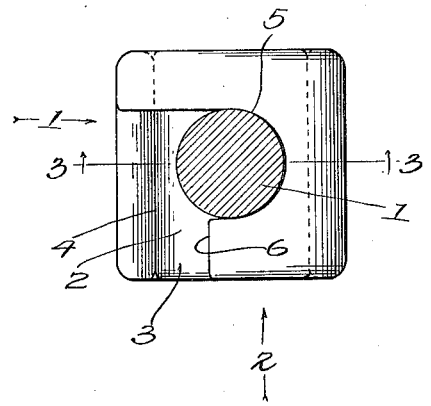
Witnesses:-
Clarence J. Williams
Florence W. Williams
Inventor
Clemens C. Cook.
by James G. Wells,
his Attorney.

UNITED STATES PATENT OFFICE.

CLEMENS C. COOK, OF MIDLAND, CALIFORNIA.

SUCKER-ROD.

1,101,682. Specification of Letters Patent. Patented June 30, 1914.

Application filed July 19, 1913. Serial No. 780,052.

*To all whom it may concern:*

Be it known that I, CLEMENS C. COOK, a citizen of the United States, residing at Midland, in the county of Kern and State of California, have invented a new and useful Sucker-Rod, of which the following is a specification.

My object is to make a sucker rod which may be easily connected and disconnected; and my invention consists of the novel features herein shown, described and claimed.

In the drawings: Figure 1 is an elevation looking in the direction of the arrows 1 in Figs. 2, 3 and 4. Fig. 2 is an elevation at a right angle to Fig. 1 as indicated by the arrows 2 in Figs. 1 and 4. Fig. 3 is a sectional detail on a plane parallel with Fig. 2, as indicated by the lines 3—3 in Figs. 1 and 4. Fig. 4 is a horizontal section looking downwardly, as indicated by the lines 4—4 in Figs. 1 and 2.

The sucker rod body 1 is made in sections. Each section has a crosshead 2 on one end and a crosshead socket 3 on the other end. The socket 3 is a straight horizontal bore 4 crosswise of the line of the rod and a vertical bore 5 leading from the bore 4 in line with the rod. A slot 6 leads from the bore 4 at an angle of about forty-five degrees, said slot extending only far enough to make an entrance to the side of the bore 5 at right angles to the bore 4. The crosshead 2 fits in the bore 4 and the stem or body 1 passes through the slot 6 into the bore 5. In connecting and disconnecting the sections are brought to an angle relative to each other and the heads moved apart or together and then the sections are brought into a straight line thereby locking them together.

I claim:

A sucker rod body made in sections, each section having a cross head on one end and a cross head socket on the other end, said socket having a straight bore crosswise of the line of the rod and a second bore leading from the first bore in line with the rod, and a slot leading from the first bore at an angle, said slot extending only far enough to make an entrance to the side of the second bore at right angles to the first bore and the cross head fitting in the first bore and the stem passing through the slot into the second bore.

CLEMENS C. COOK.

Witnesses:
O. S. SHIPE,
JOHN LANG.

Copies of this patent may be obtained for five cents each, by addressing the "Commissioner of Patents, Washington, D. C."